(12) United States Patent
Specht et al.

(10) Patent No.: US 6,688,646 B2
(45) Date of Patent: Feb. 10, 2004

(54) SEAT BELT SYSTEM WITH A BELT TENSIONER

(75) Inventors: Martin Specht, Feldafing (DE); Stephan Schwald, Hersching (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 78 days.

(21) Appl. No.: 10/135,534

(22) Filed: May 1, 2002

(65) Prior Publication Data

US 2003/0038473 A1 Feb. 27, 2003

(30) Foreign Application Priority Data

Aug. 23, 2001 (DE) .......................... 101 41 297

(51) Int. Cl.[7] .............................................. B60R 22/28
(52) U.S. Cl. ...................... 280/805; 280/806; 280/150; 297/470; 297/480; 297/388; 242/107.4; 188/67
(58) Field of Search .................... 280/806, 805, 280/150; 297/470, 480, 388; 242/107.4; 188/67

(56) References Cited

U.S. PATENT DOCUMENTS

| | | | | |
|---|---|---|---|---|
| 3,871,470 A | * | 3/1975 | Schwanz et al. | ............ 297/480 |
| 3,942,819 A | * | 3/1976 | Schwanz et al. | ............ 297/478 |
| 5,845,939 A | * | 12/1998 | Greiner et al. | .............. 280/806 |
| 6,139,058 A | * | 10/2000 | Bohmler | ...................... 280/806 |
| 6,145,881 A | * | 11/2000 | Miller, III et al. | .......... 280/806 |
| 6,199,954 B1 | * | 3/2001 | Holzapfel | ................... 297/479 |
| 6,340,176 B1 | * | 1/2002 | Webber et al. | .............. 280/806 |
| 6,382,674 B1 | * | 5/2002 | Specht et al. | ............... 280/806 |
| 6,561,936 B1 | * | 5/2003 | Betz et al. | ................... 474/110 |

FOREIGN PATENT DOCUMENTS

| | | | |
|---|---|---|---|
| DE | 2336531 | | 2/1975 |
| DE | 2836531 | * | 6/1975 |
| DE | 3044951 | * | 6/1982 |
| DE | 2426845 | * | 9/1984 |
| DE | 3328127 | * | 2/1985 |
| DE | WO99/22969 | * | 5/1999 |
| DE | 29904404 | * | 8/1999 |
| EP | 0778182 | | 9/1996 |
| EP | 1034990 | | 9/2000 |
| WO | WO 99/22969 | | 5/1999 |

* cited by examiner

*Primary Examiner*—Michael J. Carone
*Assistant Examiner*—John Richardson
(74) *Attorney, Agent, or Firm*—Lonnie Drayer; Jarett Rieger

(57) ABSTRACT

A vehicle seat belt system, in particular a three-point seat belt system, has belt webbing and an end fitting by which an end of the belt webbing is secured to a vehicle. A belt tensioner acts with a pulling eyebolt through which the belt webbing is guided by a webbing guide in the vicinity of the end fitting to transmit a tensioning movement to the belt webbing. The pulling eyebolt has a substantially straight pulling rod by which a pulling movement generated by the tensioning drive is transmitted to the belt webbing during tensioning and during tensioning the pulling rod acts as a webbing deflection rod for the belt webbing guided through the webbing guide. The webbing guide has two deflection points about which the belt webbing is guided during tensioning and the pulling rod acts on a section of the belt webbing guided between these two deflection points.

12 Claims, 6 Drawing Sheets

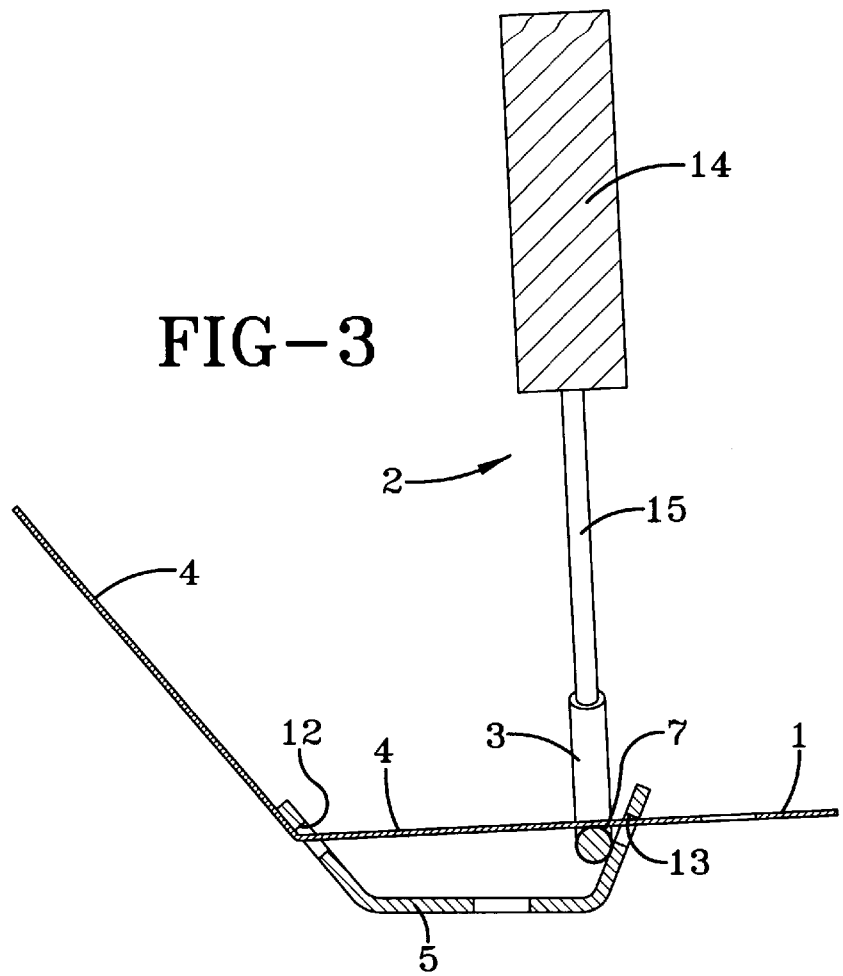
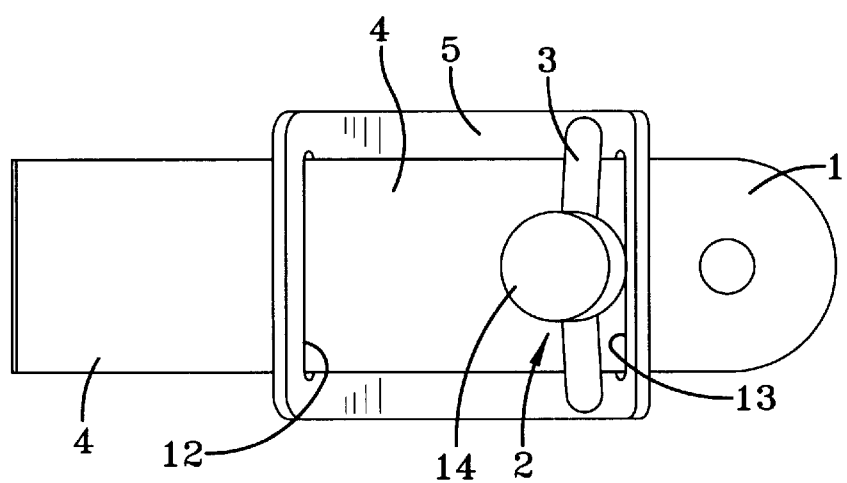

US 6,688,646 B2

SEAT BELT SYSTEM WITH A BELT TENSIONER

FIELD OF THE INVENTION

The invention relates to a seat belt system with a belt tensioner.

BACKGROUND OF THE INVENTION

A three-point seat belt is secured to a vehicle at three anchoring points when the seat belt is in a fastened condition. Conventionally these anchoring points comprise an end fitting by which the end of the belt webbing is secured to the vehicle body. A belt lock into which an insertion tab is guided movably on the belt webbing is inserted with locking on fastening the belt. An upper anchoring point is located at, or above, shoulder height for the vehicle occupant, for example a belt guide through which the belt webbing coming from the chest of the vehicle occupant is guided to the winding shaft of a automatic seat belt retractor. In the rear seats or rear benches or seat belt systems integrated within the seat, the belt guide located at, or above, shoulder height and the automatic seat belt retractor may be provided in one structural unit.

EP 0 778 182 A2 teaches, on an end fitting by which an end of the seat belt webbing is secured to the vehicle, a belt tensioner which is a pyrotechnically drivable winding shaft and which exerts a tightening retraction movement or a tensioning movement on the seat belt in a crash.

EP 1 034 990 A2 teaches a belt tensioner in which the tensioning movement is transmitted to the belt webbing with the aid of a push rod. When the known tensioning drive is installed additional belt webbing is required to form a deflection loop which is laid around a deflection face provided at the push rod end.

SUMMARY OF THE INVENTION

There is provided in accordance with the present invention a seat belt system comprising: belt webbing; an end fitting by which an end of the belt webbing is secured to a vehicle; a belt tensioner that acts with a pulling eyebolt through which the belt webbing is guided by a webbing guide in the vicinity of the end fitting to transmit a tensioning movement to the belt webbing, wherein the pulling eyebolt has a substantially straight pulling rod by which a pulling movement generated by the tensioning drive is transmitted to the belt webbing during tensioning and during tensioning the pulling rod acts as a webbing deflection rod for the belt webbing guided through the webbing guide; and the webbing guide has two deflection points about which the belt webbing is guided during tensioning and the pulling rod acts on a section of the belt webbing guided between these two deflection points.

BRIEF DESCRIPTION OF THE DRAWINGS

FIG. 3 is a side view of a seat belt system according to a second embodiment of the present invention.

FIG. 4 is a top view of the embodiment of FIG. 3.

DETAILED DESCRIPTION OF THE INVENTION

Figure 1:
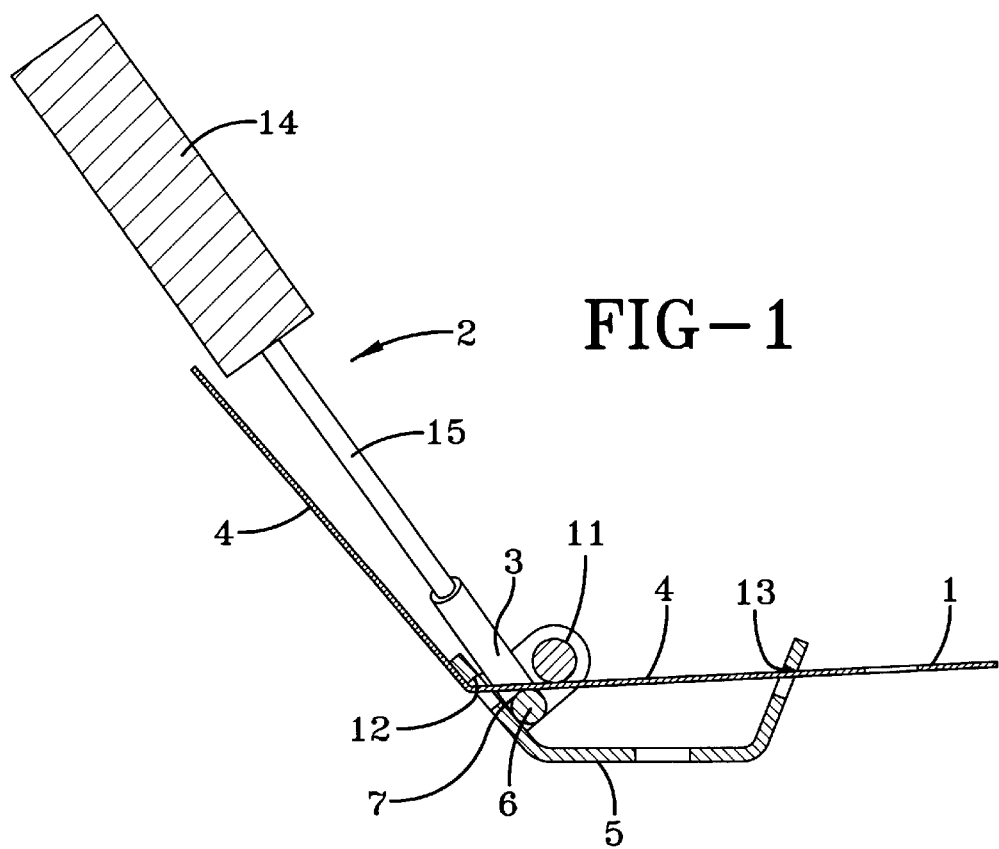
FIG. 1 is a side view of a seat belt system according to a first embodiment of the present invention.

The figures show exemplary embodiments of a vehicle seat belt system, in particular a three-point seat belt system, in which a section of the seat belt webbing, which is secured via an end fitting 1 to the vehicle body using a threaded fastener, not illustrated in more detail. In the embodiments in FIGS. 1 to 9, a webbing guide 5 is provided by which a section of the seat belt webbing 4 is guided in a straight line in the vicinity of the end fitting 1. The webbing guide 5 may also be secured to the vehicle by a threaded fastener, which is not illustrated in detail. The webbing guide 5 may be made in one piece with the end fitting 1 and has two webbing guiding edges 12, 13. One webbing guiding edge 13 is located in the vicinity of the end fitting 1 and the other webbing guiding edge 12 may be a deflection edge from which the belt webbing 4 is guided to another anchoring point of the three-point seat belt system. This other anchoring point may be a belt guide located at, or above, the shoulder height of the vehicle occupant and which where appropriate is arranged as one structural unit with a belt retractor. Structural units of this kind are used in particular for seat belts that are integrated within the seat and in rear benches of passenger vehicles. The belt guide 5 is located in the region of the vehicle sill or is provided slightly above the vehicle sill, in particular in the region of the rear bench of the vehicle.

The exemplary embodiments illustrated have a belt tensioner 2 that has a tensioning drive 14, for example a linear drive. The tightening, or retraction, movement generated by the tensioning drive 14 is transmitted to the belt webbing 4 by a pulling device 15, for example a cable pull or pair of cable pulls. To this end, a pulling eyebolt 3 is provided at the front end of the pulling device 15. The pulling eyebolt preferably has the form of an isosceles triangle. At the base of this isosceles triangle is located a pulling rod 6 which acts on the belt webbing 4 during tensioning or a tightening retraction movement. In the embodiments of FIGS. 1 to 7, the pulling rod 6 acts on a section of the belt webbing 4 guided in a straight line by the webbing guide 5.

Figure 2:
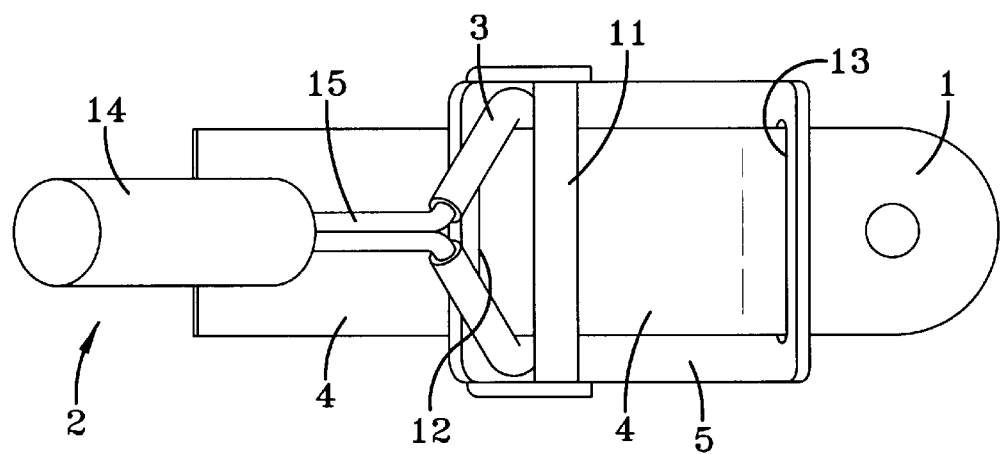
FIG. 2 is a top view of the embodiment of FIG. 1.
Figure 5:
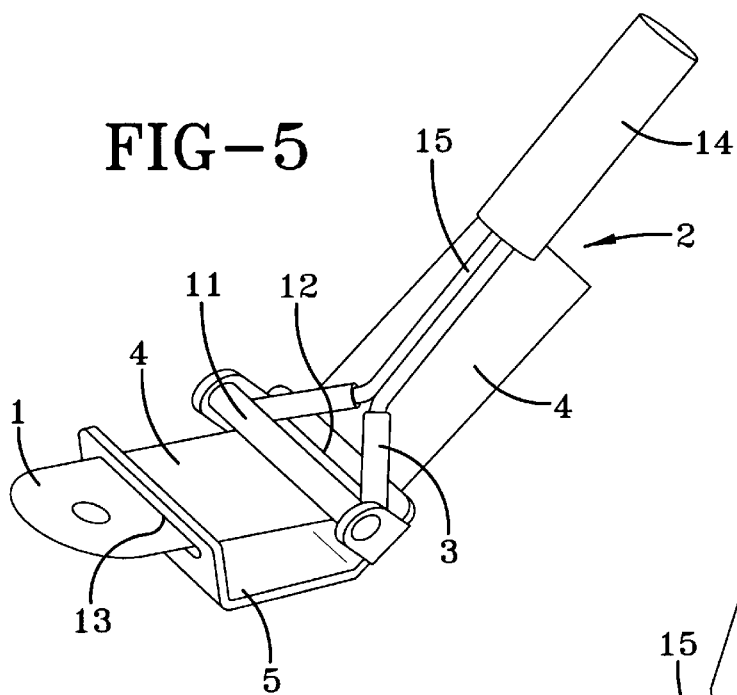
FIG. 5 is a perspective view of the embodiment of FIGS. 1 and 2.

In the embodiment illustrated in FIGS. 1, 2 and 5, the direction of pulling in which the pulling rod 6 is driven by the tensioning drive 4 is approximately parallel to the direction in which the belt webbing 4 is guided from the webbing guiding edge 12, which at the same time acts as a webbing deflection member, to the other anchoring point of the seat belt, in particular the webbing deflection member on the vehicle which is located at, or above, shoulder height. To this end, the pulling device 15 extends from the pulling eyebolt 3, approximately parallel to the belt webbing 4 or at an acute angle thereto, as can be seen in particular in FIGS. 1 and 5.

In this embodiment, furthermore, a webbing deflection member 11 with a rounded webbing deflection face is provided between the two webbing guiding edges 12, 13 of the webbing guide 5. When the seat belt is tensioned, the pulling rod 6 moves between the deflection point that is formed by the webbing guiding edge 12, and the webbing deflection member 11. At the same time, the belt webbing 4 is drawn between the two deflection points as a webbing loop deflected around the pulling rod 6. As already mentioned, the deflection point is formed by the webbing guiding edge 12. However, it is also possible to provide an additional deflection point within the webbing guide 5. During tensioning, the pulling rod 6 acts as a webbing deflection rod or as a third webbing deflection member, with the result that on tensioning the belt webbing 4 is retracted by approximately twice the length corresponding to the length of tightening movement of the pulling eyebolt.

Figure 6:
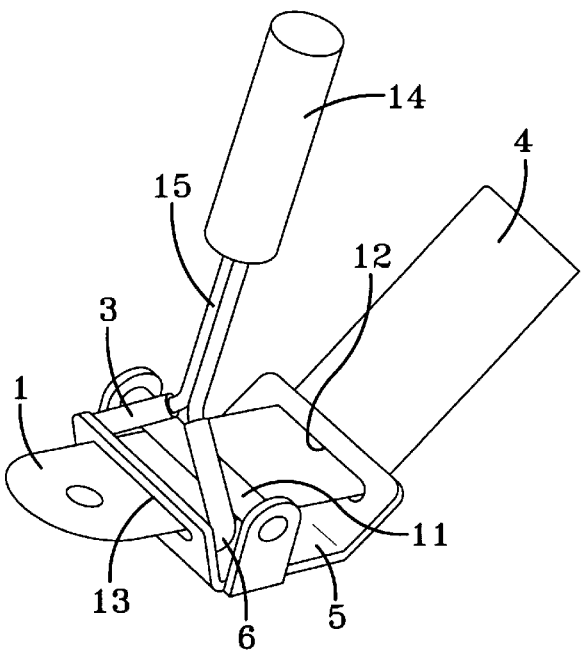
FIG. 6 is a perspective view of a third embodiment.

In the embodiment illustrated in FIG. 6, the webbing deflection member 11 is located in the vicinity of the webbing guiding edge 13 of the belt guide 1. The webbing guiding edge 13 then acts as the webbing deflection member when the belt webbing 4 is tensioned. The mode of operation of the embodiment of FIG. 6 is the same as that of the embodiment of FIGS. 1, 2 and 5. However, the direction of pulling in which the pulling rod 6 of the pulling eyebolt 3 is moved is approximately perpendicular to the direction of guiding the belt webbing 4 in a straight line between the webbing guiding edges 12, 13 of the webbing guide 5.

Figure 7:
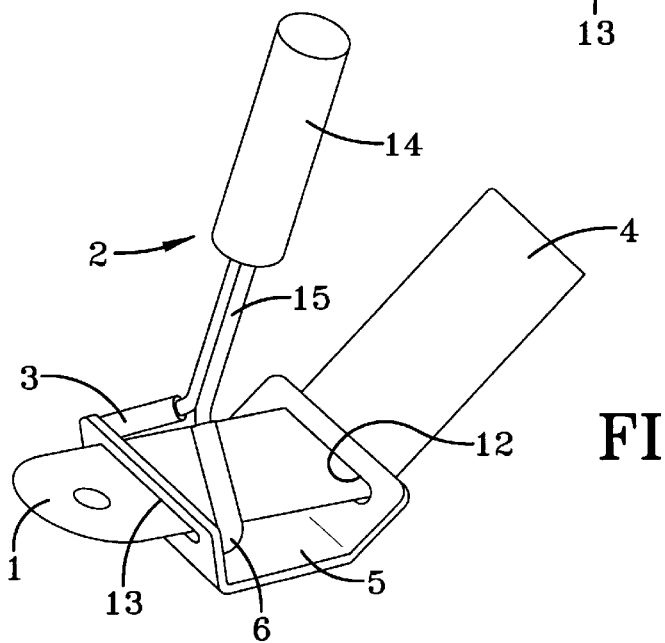
FIG. 7 is a perspective view of the embodiment of FIGS. 3 and 4.

In the embodiment of FIGS. 3, 4 and 7, the pulling rod 6 acts on the belt webbing 4 guided in a straight line between the two webbing guiding edges 12, 13. The point of action lies in the vicinity of the webbing guiding edge 13, of the belt guide 1. An additional webbing deflection member as provided in the embodiments of FIGS. 1, 2, 5 and 6 is missing in this embodiment. The direction of pulling in which the pulling rod 6 is moved by the tensioning drive 14 is approximately perpendicular to the direction of guiding the belt webbing 4 between the webbing guiding edges 12, 13. In the embodiments of FIGS. 1 to 7, however, it is also possible for the direction of pulling the belt webbing to run obliquely with respect to the belt webbing 4 guided in a straight line between the webbing guiding edges 12, 13. With a direction of pulling other than the perpendicular direction of pulling as shown in FIGS. 3, 4, 6 and 7, however, it is advantageous to provide an additional webbing deflection member such as the webbing deflection member 11 between the webbing guiding edges 12, 13.

Figure 8:
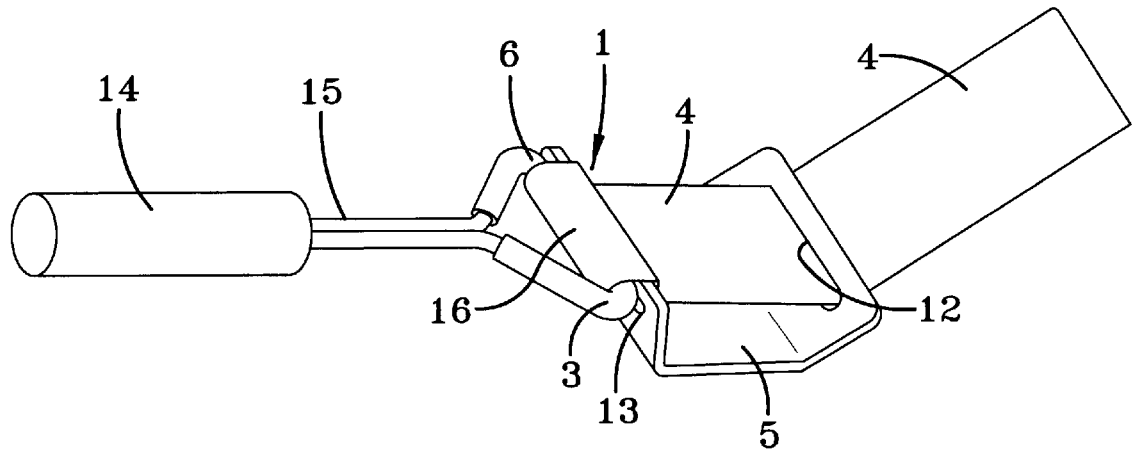
FIG. 8 is a perspective view of a fourth embodiment.
Figure 9:
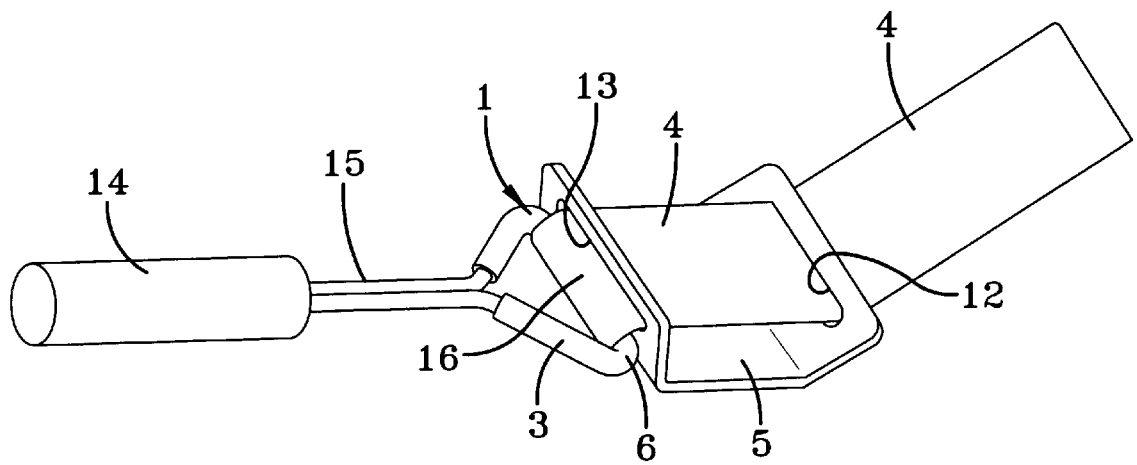
FIG. 9 is a perspective view of a fifth embodiment.

In the embodiments of FIGS. 8 and 9, the end fitting 1 is formed on the webbing guide 5 in the form of an anchoring loop 16 on the end of the webbing, this loop being looped around an anchoring web on the one end of the webbing guide. The webbing guide 5 is also anchored to the vehicle body by a threaded fastener, not illustrated in more detail, as in all the exemplary embodiments. The pulling rod 6 engages in a webbing loop whereof one end merges with the belt webbing 4 guided in a straight line in the webbing guide 5. The tensioning drive 14 is used to move the pulling rod 6, by way of the pulling device 15, to the left as seen in the embodiments 8, 9, that is to say in opposition to the webbing direction in which the belt webbing 4 is guided in a straight line in the direction of guiding the webbing to the other anchoring point of the seat belt. Here too, during tensioning a webbing loop is formed whereof the length corresponds to twice the length of the tensioning and tightening retraction movement of the pulling rod. In these embodiments too, the pulling rod 6 acts as a deflection rod around which the webbing loop pulled out during tensioning is deflected.

Figure 10:
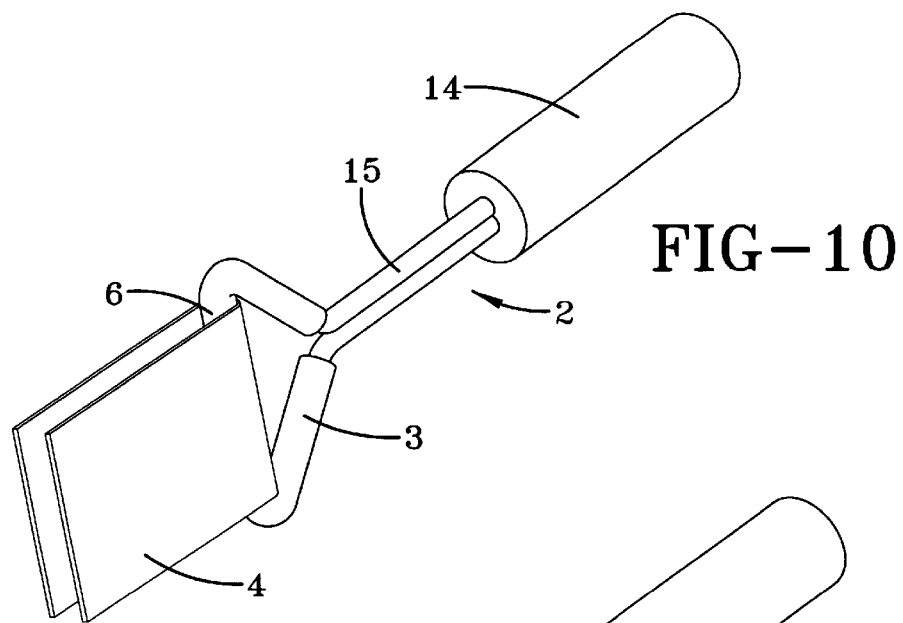
FIG. 10 is a perspective view of an embodiment of a webbing guide in a pulling eyebolt of the belt tensioner.
Figure 11:
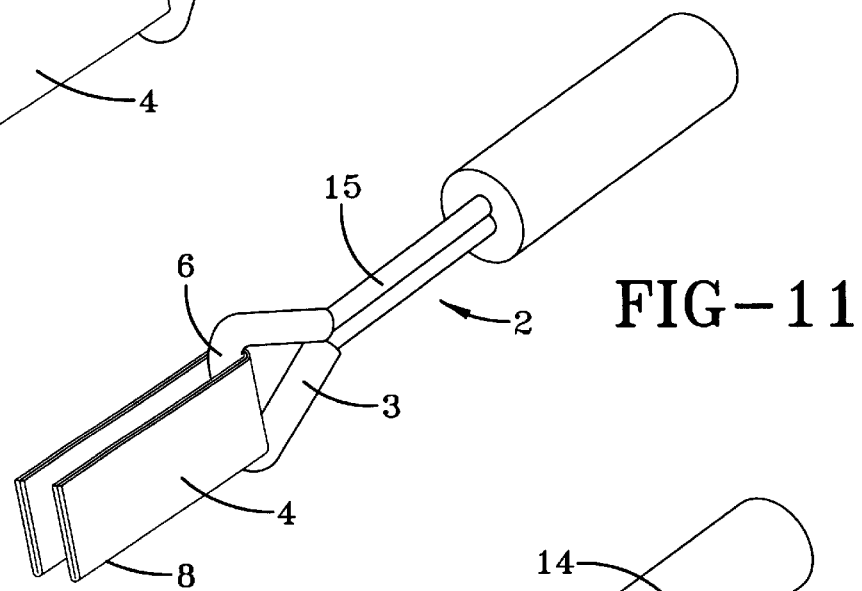
FIG. 11 is a perspective view of a further embodiment of a webbing guide in the pulling eyebolt of the belt tensioner.
Figure 12:
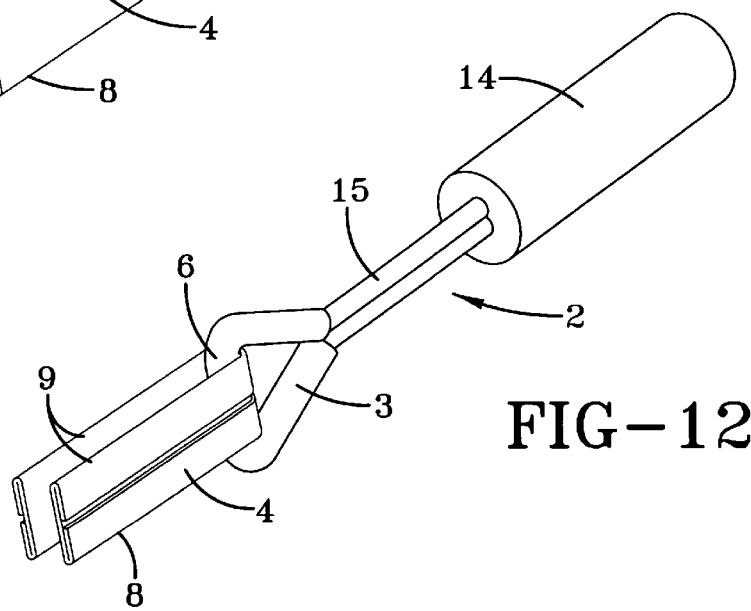
FIG. 12 is a perspective view of a third embodiment of a webbing guide in the pulling eyebolt of the belt tensioner.

The pulling rod 6 may have a length corresponding approximately to the width of the belt webbing 4, as shown in the embodiment of the belt tensioner 2 of FIG. 10. In the embodiment of the belt tensioner 2 in FIG. 11, the length of the pulling rod 6 corresponds approximately to half the width of the belt webbing 4. The belt webbing 4 is folded about a fold edge 8 in this embodiment. The fold edge 8 runs approximately along the webbing longitudinal center of the belt webbing 4. In the embodiment illustrated in FIG. 12, the length of the pulling rod 6 of the pulling eyebolt 3 again corresponds to half the width of the belt webbing 4. The belt webbing 4 is folded about two fold edges 8, 9. The fold edges 8, 9 are at a spacing from one another corresponding to approximately half the webbing width. The two outer strips of webbing are folded towards one another in such a way that the side edges of the belt webbing 4 abut against one another. During assembly, in the embodiments of FIGS. 11 and 12 the belt webbing 4, in the already folded condition, is inserted into the triangular pulling eyebolt 3. During tensioning, the legs of the triangular pulling eyebolt 3 that extend towards one another ensure that the folded shape is maintained on being guided around the pulling rod 6. As a result of this, the structural width of the belt tensioner is reduced. In addition, a folding device 17 may be provided on the webbing guide 5 and used during tensioning to fold the belt webbing guided to the other anchoring point into the shape shown in FIG. 12.

Figure 13:
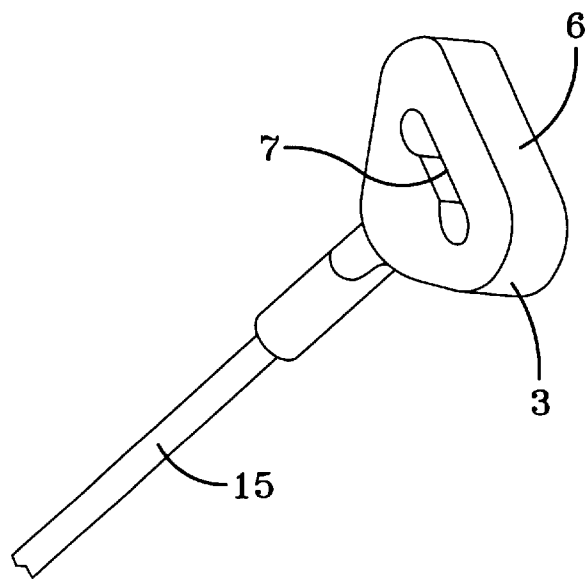
FIG. 13 is a perspective view of an embodiment of a pulling eyebolt of the belt tensioner that may be used in the embodiments illustrated.
Figure 14:
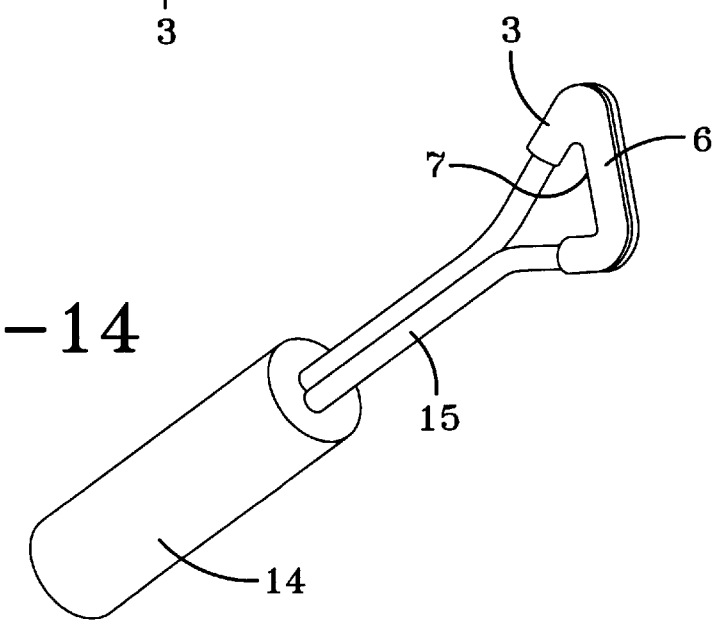
FIG. 14 is a perspective view of a further embodiment of a pulling eyebolt that may be used in the embodiments illustrated.
Figure 15:
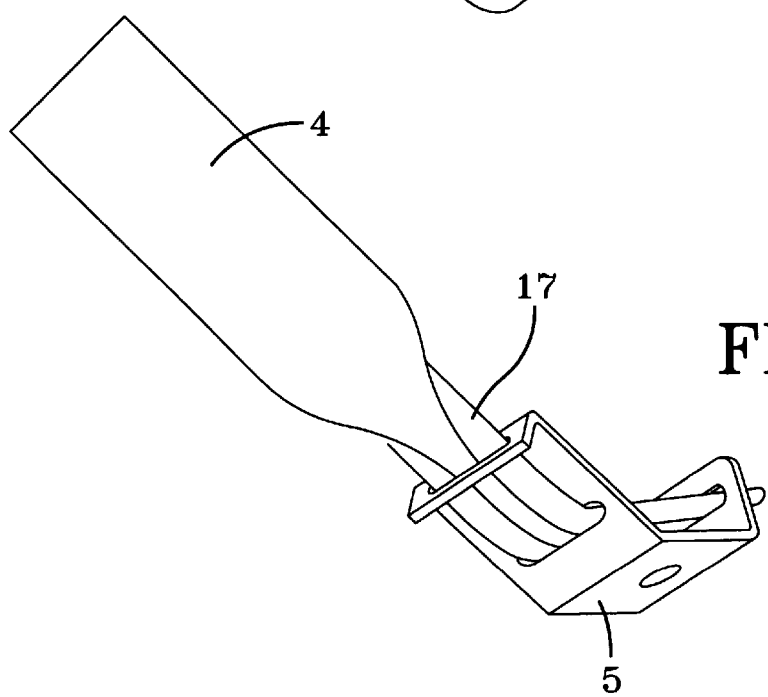
FIG. 15 is a perspective view of a folding device that may be used in the foregoing embodiments.

The pulling eyebolt 3 has a low friction in particular in the region of the deflection face 7 of the pulling rod 6. To this end, a friction-reducing covering as illustrated in FIG. 13 may be provided on the pulling rod 6 or on the entire pulling eyebolt 3. Furthermore, it is possible to provide a plastics material sheath which may be clipped on, as illustrated in FIG. 14. The deflection face 7 is rounded, as can be seen in particular from FIGS. 1 and 3, with the result that a low-friction deflection face 7 is obtained when the seat belt is tensioned. However, it is also possible to construct the deflection face 7 as a rolling surface. The pulling rod 6 may in that case have a deflection roller or indeed a plurality of deflection rollers.

Many changes and modifications in the above described embodiments of the invention can, of course, be carried out without departing from the scope thereof. Accordingly, that scope is intended to be limited only by the scope of the appended claims.

We claim:

1. A seat belt system comprising:

belt webbing;

an end fitting by which an end of the belt webbing is secured to a vehicle;

a bell tensioner comprising a tensioning drive and a pulling eyebolt, the tensioner drive is connected to the eyebolt, the belt webbing passes through the eyebolt, wherein the pulling eyebolt has a substantially straight pulling rod disposed on the base thereof whereby the pulling rod applies force on the seatbelt webbing during tensioning generated by the tensioning drive; and a webbing guide for guiding the belt webbing in a vicinity of the end fitting, the webbing guide has at least one web guiding edge whereby the pulling rod engages with the belt webbing in a location between the at least one web guiding edge and the end fitting.

2. The seat belt system according to claim 1, wherein the Webbing guide has a first webbing guiding edge and a second webbing guiding edge between which the belt webbing is guided in a straight line.

3. The seat belt system according to claim 2, wherein the direction of pulling in which the pulling rod is moved by the tensioning drive lies approximately parallel or at an acute angle to the direction of guiding the webbing in which the belt webbing is guided away from the webbing guide to one of the other anchoring points, secured to the vehicle, of the seat belt.

4. The seat belt system according to claim 2, wherein the direction of pulling in which the pulling rod is moved by the tensioning drive is directed substantially in opposition to the straight line of the direction of guiding the webbing between the two webbing guiding edges.

5. The seat belt system according to claim 2, wherein the direction of pulling in which the pulling rod is moved by the tensioning drive runs approximately at a right angle to the belt webbing guided in a straight line between the two webbing guiding edges.

6. The seat belt system according to claim 1, wherein the belt webbing has a width and the pulling rod has a length that is about the same as the width of the belt webbing.

7. The seat belt system according to claim 2, wherein the belt webbing has a width and the pulling rod has a length that is about the same as the width of the belt webbing.

8. The seat belt system according to claim 1, wherein the belt webbing has a width and the pulling rod has a length that is approximately half the width of the belt webbing through the pulling eyebolt guided in the folded condition.

9. The seat belt system according to claim 2, wherein the belt webbing has a width and the pulling rod has a length that is approximately half the width of the belt webbing through the pulling eyebolt guided in the folded condition.

10. The seat belt system according to claim 4, wherein the belt webbing guided through the pulling eyebolt is folded about one or two fold edges running in the longitudinal direction of the webbing.

11. The seat belt system according to claim 1, wherein the first webbing guide edge is in closer proximity to the end fitting than the second webbing guide edge, wherein the pulling rod engages with the belt webbing in a location between the second webbing guide edge and the end fitting.

12. The seat belt system according to claim 11, wherein the webbing guide comprises a webbing deflection member with a rounded webbing deflection face disposed between the first webbing guide edge and the second webbing guide edge.

* * * * *